July 9, 1963  J. W. McMILLEN, JR., ETAL  3,097,259
BUS BAR APPARATUS AND SUPPORTING MEANS
Filed June 27, 1961

WITNESSES

INVENTORS
James W. McMillen, Jr.
& Glenn E. Rhodes
BY
ATTORNEY

United States Patent Office 3,097,259
Patented July 9, 1963

3,097,259
BUS BAR APPARATUS AND SUPPORTING MEANS
James W. McMillen, Jr., and Glenn E. Rhodes, Monroeville, Pa., assignors to Westinghouse Electric Corporation, East Pittsburgh, Pa., a corporation of Pennsylvania
Filed June 27, 1961, Ser. No. 119,962
2 Claims. (Cl. 174—153)

This invention relates generally to bus bar apparatus and more particularly to means for supporting bus bars in a spaced relationship.

An object of this invention is to provide improved means for supporting bus bars in a spaced relationship.

In certain types of power switchgear installations, for example, metal clad switchgear installations, circuit breakers are housed in separate metallic housing units each of which units comprises a plurality of separate compartments for housing the switchgear apparatus. When the switchgear apparatus embodies more than one circuit breaker, for example two circuit breakers, the two units for the two circuit breakers are generally disposed in a side-by-side relationship with a common wall therebetween. Bus bars are used to transmit electric power from one compartment of one of these units to another compartment of the adjacent unit. This general type of structure is shown, for example, in the patent to H. B. Wortman et al. Patent No. 2,952,799 which patent discloses in FIGS. 13 and 14 a plurality of the above mentioned type of units, and in FIG. 10 a compartment 55 for housing the bus bars that are used to transmit power between the various units. In this general type of structure, it is expedient to have the bus bar supporting means serve also as a common wall that separates the compartments and functions as a flame barrier between the compartments.

Accordingly, another object of this invention is to provide improved bus bar apparatus comprising improved means for supporting a plurality of bus bars which support means also serves as a barrier or wall between two isolated compartments.

A further object of the invention is to reduce radio interference and flashover tendency of metal enclosed switchgear.

For a better understanding of the nature and objects of this invention, reference may be had to the following detailed description when taken in conjunction with the accompanying drawings, in which.

Figure 2:
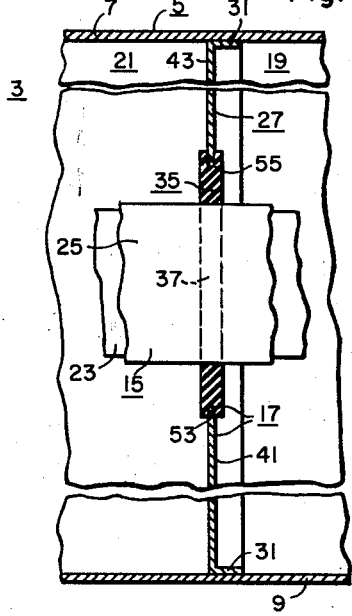
FIG. 2 is a partial sectional view taken along line II—II of FIG. 1, the bus bars being shown in elevation.
Figure 1:
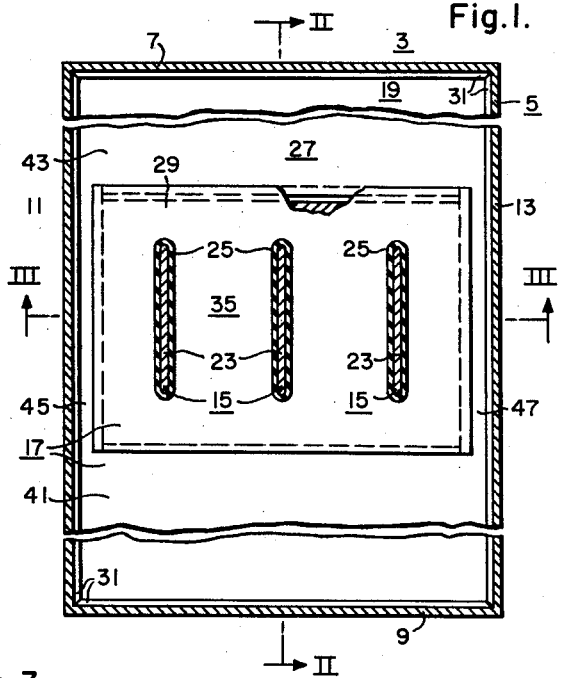
FIGURE 1 is a sectional view taken through a bus bar compartment and illustrating principles of this invention.
Figure 3:
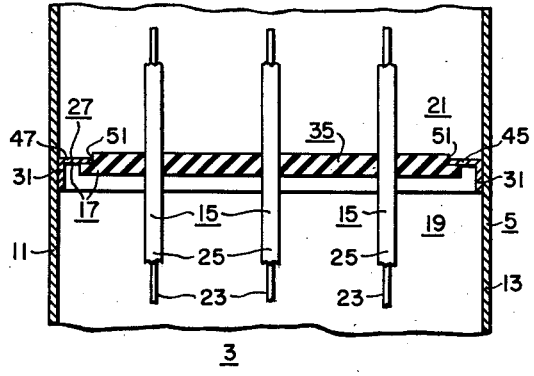
FIG. 3 is a sectional view taken along line III—III of FIG. 1, the bus bars being shown in elevation.

Referring to the drawings, and particularly to FIGS. 1–3, there is shown therein bus bar apparatus indicated generally at 3 disposed in a housing indicated generally at 5. The housing 5 comprises four metallic side members 7, 9, 11 and 13. Three bus bars indicated at 15, each of which generally carries a different phase of a three phase system of power distribution, are supported within the housing 5 by means of support means indicated generally at 17, which support means serves also as a barrier or common wall separating the housing 5 into two compartments indicated generally at 19 and 21. The bus compartments 19 and 21 may be of the type shown for example at 55 in FIG. 10 of the above mentioned patent to H. B. Wortman et al., each of which compartments is a part of a separate metallic switchgear housing unit as shown for example in FIGS. 13 and 14 of the H. B. Wortman et al. patent. Each of the bus bars 15 (FIGS. 1–3) comprises a bar portion of conducting material 23 covered by an insulating covering 25.

The support means 17 comprises a metallic plate 27 having a generally rectangular opening 29 (FIG. 1) therein. The plate 27 is supported within the housing 5 by means of four flange portions 31 on the plate that are welded or otherwise suitably secured to the metallic side walls 7, 9, 11 and 13 of the housing. Although the plate 27 is shown as having the flange portions 31 integral therewith, it can be understood that other supporting means could be used. For example, the plate could be completely flat and it could be supported within the housing 5 by means of four generally L-shaped brackets in place of the flange portions 31.

In addition to the metallic plate 27, the support means 17 comprises a bus bar support member 35 of insulating and flame resistant material which member is supported in the opening 29 of the plate 27. The insulating bus bar support member 35 has three openings 37 (FIG. 2) therein each of which openings receives one of the bus bars 15 to support the bus bars in a generally parallel spaced relationship within the housing 5.

As best seen in FIG. 1, the single metallic plate 27 comprises a single member having four plate portions 41, 43, 45 and 47 on the four opposite sides of the opening 29. The designation herein of the four plate portions of the plate 27 serves to illustrate that the plate 27 could comprise more than one portion, and to provide a basis for terminology that is used in the claims for adequate protection of the invention.

As seen in FIG. 3, the bus bar support member 35 has a recess 51 at each of two opposite sides thereof. As shown, for example, in FIGS. 2, 4 and 5, the bus bar support member 35 has a notch or slot 53 at its lower side and a deeper notch or slot 55 at its upper side. The provision of these recesses 51 and slots 53, 55 enables the bus bar support member 35 to be supported on the plate 27 merely by engagement of the parts of the bus bar support member with the plate 27. In fact, the bus bar support member 35 could be adequately supported on the plate 27 merely by means of the slots 53 and 55. As can be seen in FIG. 3, however, the recesses 51 provide for an overlapping of parts of the support member 35 with parts of the metallic plate 27 to more adequately isolate the compartments 19 and 21 from each other, and for additional reasons to be hereinafter described.

Figures 4, 5:
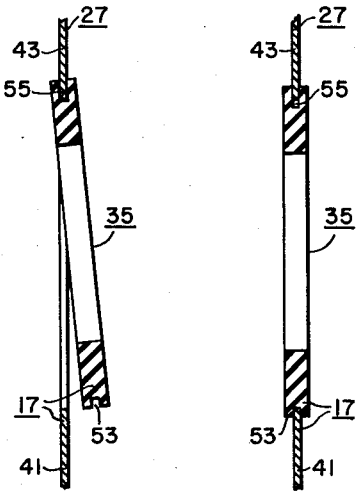
FIG. 4 is a partial sectional view, on an enlarged scale relative to FIGS. 1–3, illustrating the bus bar support member shown in FIGS. 1–3 as it is being mounted in position.
FIG. 5 is a view, similar to FIG. 4, showing the bus bar support member after it has been mounted in position.

As was previously mentioned, the plate 27 (FIGS. 1–3), is stationarily supported on the housing 5. When it is desired to mount the bus bar support member 35 in position, the member 35 is moved from right to left (FIGS. 2, 4 and 5) so that the depressed portions 51 (FIG. 3) of the support member 35 will receive the side plate portions 45 and 47 of the plate 27. The member 35 is tilted and pushed upward as seen in FIG. 4 so that the upper plate portion 43 will pass into the deep slot 55. The support member 35 is then pivoted so that the slot 53 is just over the lower plate portion 41 of the supporting plate 27. The bus bar support member 35 is then dropped down to the position shown in FIG. 5 in which position the support member 35 is supported merely by engagement of the parts of the support member with the supporting plate 27. As shown more clearly in FIGS. 4 and 5, the upper slot 55 is deeper than the slot 53 to permit mounting of the insulating support member 35 since the plate 27 as was previously described is rigidly and stationarily supported in the housing 5 (FIGS. 1–3).

With the bus bar support member in position, the bus bars 15 are passed through the openings 37 (FIG. 2) in the support member whereby the bus bars 15 are supported by the support member in a spaced relationship in the housing 5. As can be seen in FIGS. 1–3, the bus bar support means 17, which comprises the metallic plate 27 and bus bar support member 35, serves not only as means for supporting the bus bars in a spaced relationship; but also as a common fire wall or barrier isolating the compartments 19 and 21 to thereby prevent the spreading of fire between the compartments in case of an arcing fault in one of the compartments.

With the provision of the recesses 51 and notches 53, 55 in the support member 35, when the support member is mounted in position (FIGS. 1–3 and 5) parts of the support member 35 overlap or cover parts of the plate 27 on all sides of the opening 29 (FIG. 1) to isolate the compartments 19 and 21 from each other. The recesses 51 and the notches or slots 53, 55 in the support member 35 also provide an insulating cover for any sharp edges or points that may exist on the metallic plate 27. Such cover tends to inhibit or limit radiation of interference in the radio spectrum to thereby satisfy standards that have been set for the industry. Moreover, such cover tends to inhibit flashover between the bus bars 15 and the metallic plate 27.

Figure 6:
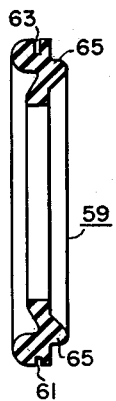
FIG. 6 is a side sectional view of a bus bar support member of a different embodiment of the invention.

Referring to FIG. 6, there is shown therein a side sectional view of a modified bus bar support member 59 having a slot 61 at its lower side and a deeper slot 63 at its upper side. Although they cannot be seen in FIG. 6, the support member 59 has recesses at its opposite sides similar to the recesses 51 (FIG. 3) for receiving the plate portions 45 and 47 as shown in FIG. 3. The support member has a tortuous shape, as shown at 65, which shape extends all the way around the support member opposite the slots 61, 63 and also opposite the above mentioned recesses (not shown) that are similar to the recesses 51 shown in FIG. 3. The tortuous shape 65 provides additional over-the-surface clearance (or creepage distance) between the bus bars 15 (FIG. 1) that are to be supported by the support member 59 and the metallic plate 27 (FIG. 1) to which the support member 59 is to be mounted. Otherwise, the support member 59 is the same as the support member 35.

From the foregoing description, it is apparent that applicants have provided an improved bus bar apparatus comprising improved means for supporting bus bars within a housing. The insulating bus bar support member is supported on a metallic plate merely by engagement of parts of the support member and plate with each other, and without the necessity for additional support means. The bus bar support member is of an insulating and flame resistant material that can be molded in one piece or otherwise formed as a unitary member. In addition to supporting the bus bars in a spaced relationship, the improved supporting means of this invention serves as a common wall or barrier between two compartments to prevent the spreading of fire from one compartment to the other compartment.

Since numerous changes may be made in the above-described construction, and different embodiments of the invention may be made without departing from the spirit and scope thereof, it is intended that all matter contained in the foregoing description or shown in the accompanying drawings shall be interpreted as illustrative and not in a limiting sense.

We claim as our invention:

1. Bus bar apparatus comprising, in combination, a flat rigid plate comprising four rigid plate portions disposed in the same general plane and having an opening therebetween, said plate portions comprising an upper and a lower and two side plate portions, said plate portions encompassing said opening, an insulating bus bar support member having an upper and a lower side and a notch in each of said sides, the notch in said upper side being deeper than the notch in said lower side, said bus bar support member being supported on said plate with the notch in said lower side receiving said lower plate portion and the notch in said upper side receiving said upper plate portion, said bus bar support member having a set of at least three openings therein each of which receives a different bus bar of a set of multi-phase bus bars to support said bus bars, each of said bus bars substantially closing the opening through which it passes, and said bus bar support member having recesses therein receiving said side plate portions whereby when said support member and said bus bars are in position the opening in said plate is substantially closed.

2. Bus bar apparatus comprising, in combination, a plate comprising four rigid plate portions disposed in the same general plane and having an opening therebetween, said plate portions comprising an upper and a lower and two side plate portions, said plate portions encompassing said opening, an insulating bus bar support member having an upper and a lower side and a notch in each of said sides, the notch in said upper side being deeper than the notch in said lower side, said bus bar support member being supported on said plate with the notch in said lower side receiving said lower plate portion and the notch in said upper side receiving said upper plate portion, said bus bar support member having a set of at least three openings therein each of which openings receives a different bus bar of a multi-phase set of bus bars to support said bus bars, each of said bus bars substantially closing the opening through which it passes, said bus bar support member having recesses therein receiving said side plate portions whereby when said support member and said bus bars are in position the opening in said plate is substantially closed, and said bus bar support member having a ridge formed integral therewith on each of two opposite sides thereof each of which ridges extends around the set of bus bars to insulate said bus bars from said four plate portions.

References Cited in the file of this patent
UNITED STATES PATENTS

| | | |
|---|---|---|
| 1,809,864 | Pearson | June 16, 1931 |
| 2,844,511 | Kiffe | Feb. 9, 1932 |
| 2,411,128 | Carlson | Nov. 12, 1946 |
| 2,427,742 | Peterson et al. | Sept. 23, 1947 |
| 2,868,864 | Page | Jan. 13, 1959 |